United States Patent [19]

Wilson

[11] 4,230,246

[45] Oct. 28, 1980

[54] SPARE TIRE CARRIER

[76] Inventor: Thomas S. Wilson, 209 S. Holmes, Memphis, Tenn. 38111

[21] Appl. No.: 29,137

[22] Filed: Apr. 11, 1979

[51] Int. Cl.³ .......................... B60R 9/00; B60R 7/02
[52] U.S. Cl. ............................... 224/42.21; 224/42.23; 224/42.13; 224/42.44
[58] Field of Search ............... 224/42.23, 42.21, 42.41, 224/42.44, 281, 310, 311, 42.21, 42.44, 42.13

[56] References Cited

U.S. PATENT DOCUMENTS 2,547,083  4/1951  Lundgren ........................... 224/42.44
3,559,829  2/1971  Shamel ........................... 224/42.21 X Primary Examiner—Steven M. Pollard

[57] ABSTRACT

An apparatus for mounting within the trunk of an automobile to hold the spare tire of the automobile and allow the spare tire to be moved between a stored, out-of-the-way location and a location where it can be easily removed from and returned to the trunk. The apparatus includes a tongue member for engaging structure of the automobile when the spare tire is in the location where it can be easily removed from the trunk to support the spare tire and portions of the apparatus in that location and prevent twisting or turning of the spare tire and portions of the apparatus.

6 Claims, 11 Drawing Figures

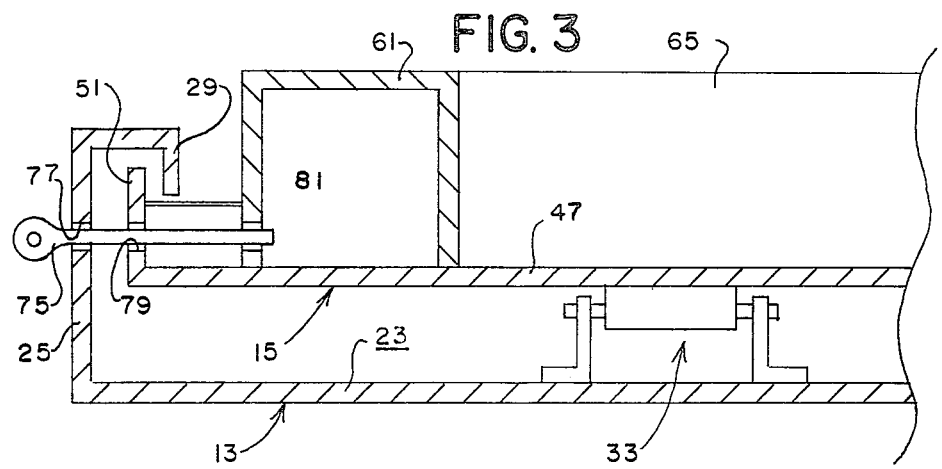
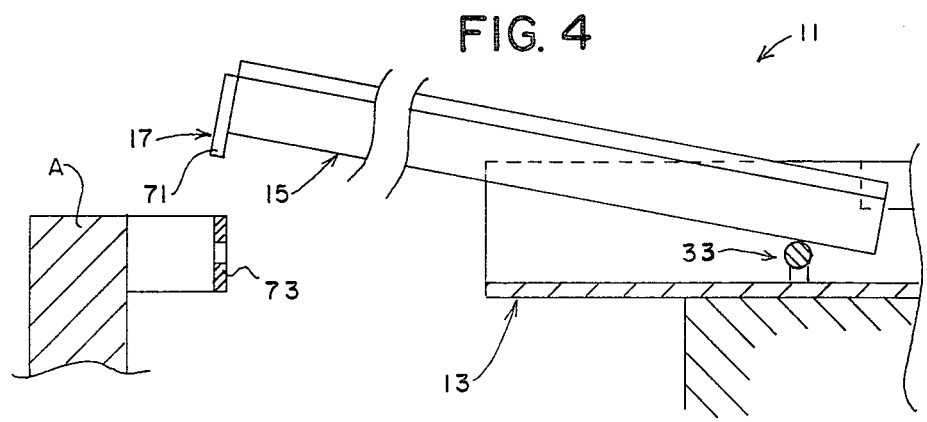
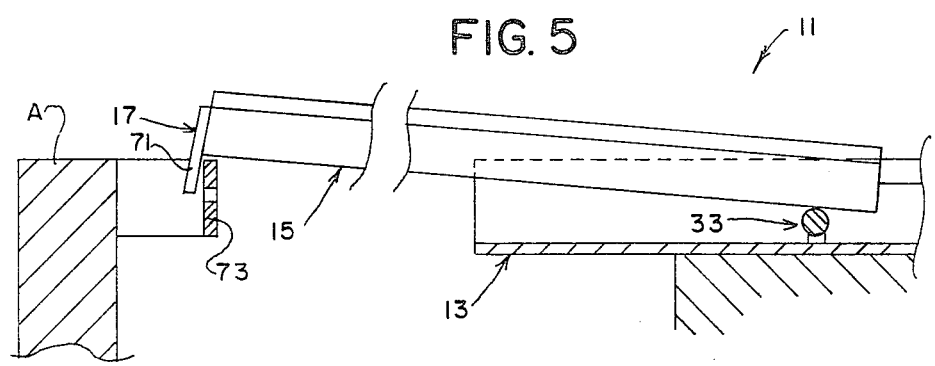

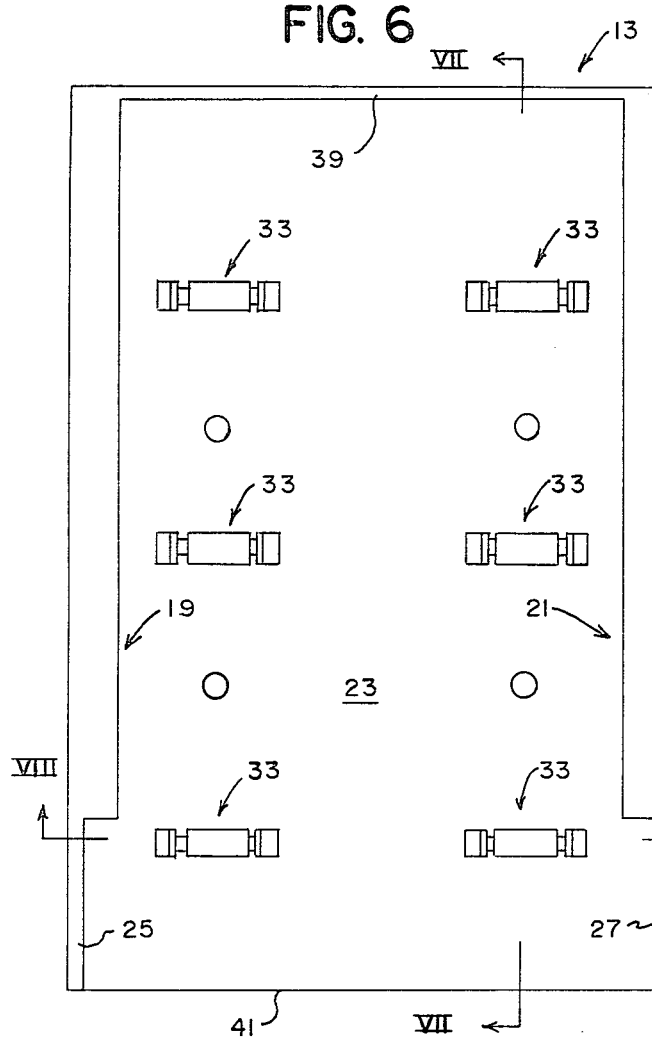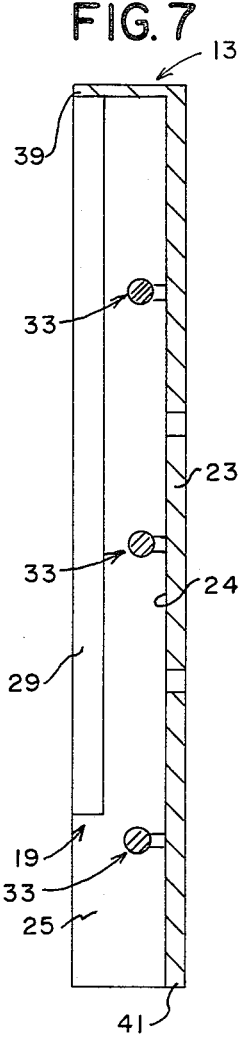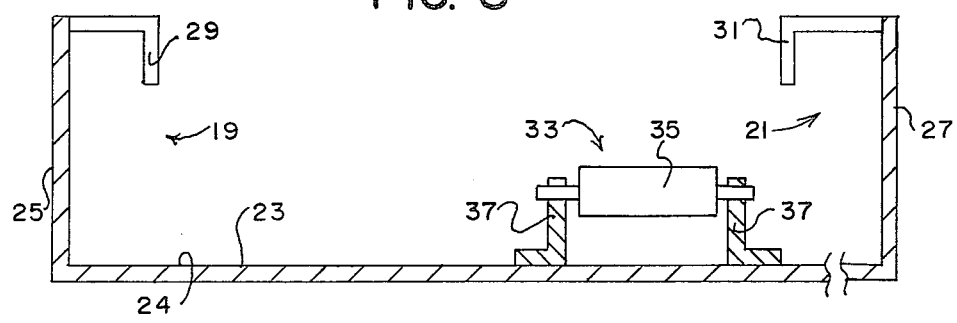

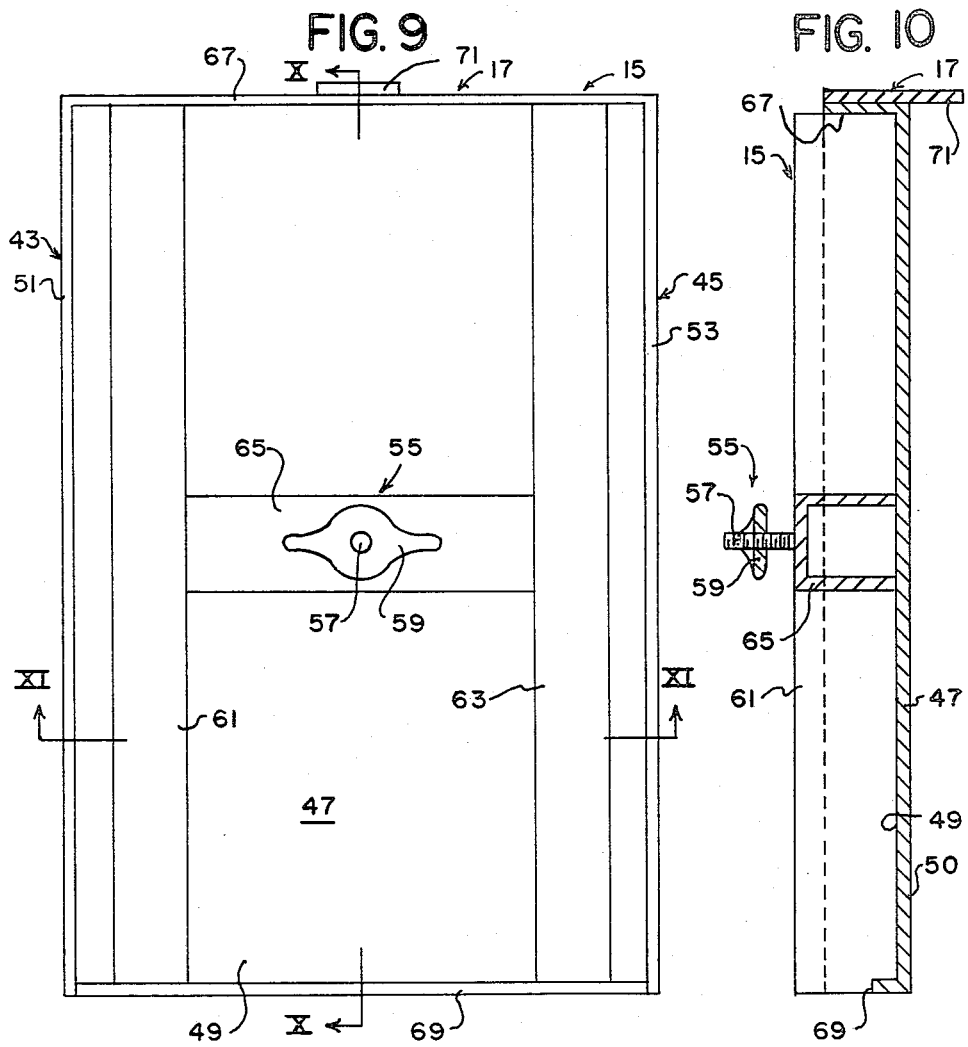
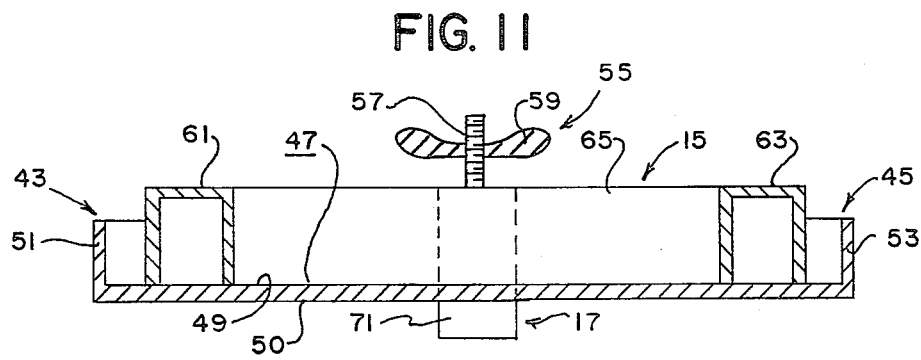

SPARE TIRE CARRIER

BACKGROUND OF THE INVENTION

1. Field of the Invention

This present invention relates in general to apparatuses for increasing the accessibility of automobile spare tires while allowing such spare tires to be stored in an out-of-the-way location.

2. Background of the Present Invention

Various apparatuses in the same general field as the present invention have heretofore been developed. See, for example, Girl, U.S. Pat. No. 2,091,069; Girl, U.S. Pat. No. 2,091,071; Perkins, U.S. Pat. No. 2,603,527; Torkowski, U.S. Pat. No. 2,995,283; Fernicola, U.S. Pat. No. 3,365,084; Woods, U.S. Pat. No. 3,554,415; Shamel, U.S. Pat. No. 3,559,829; Hoisington, U.S. Pat. No. 3,883,018; Bott, U.S. Pat. No. 3,940,041; and Miller, U.S. Pat. No. 4,087,032. None of the above patents disclose or suggest the present invention.

SUMMARY OF THE INVENTION

The present invention is directed towards providing an improved apparatus for mounting a spare tire or the like in the trunk of an automobile. One object of the present invention is to provide such an apparatus which is mounted in a substantially inaccessible, out-of-the-way location in the trunk and which can be easily moved to an easily accessible location to allow the spare tire to be conveniently, easily, safely, and without danger of physical injury or injury to clothes, etc., removed from and returned to the trunk. A further object of the present invention is to accomplish the above without the necessity of unloading the trunk. Another object of the present invention is to provide such an apparatus with means to firmly support the spare tire and the spare tire support structure in the easily accessible location without excessive twisting or turning of the spare tire.

The apparatus of the present invention includes, in general, substructure means for attachment to structure of an automobile within the trunk thereof in a location which will not hinder the loading or unloading of the trunk, the substructure means including track means; superstructure means for selectively supporting the spare tire or the like, the superstructure means including race means for coacting with the track means to guide the superstructure means between a first position in which the superstructure means is positioned substantially over the substructure means and a second position in which the superstructure means extends outwardly from the substructure means to position the spare tire or the like in a location where it can be easily removed from the trunk; and tongue means attached to the superstructure means for engaging structure of the automobile when the superstructure means is in the second position.

BRIEF DESCRIPTION OF THE DRAWINGS

FIG. 3 is an enlarged sectional view as taken on line III—III of FIG. 1 with some parts broken away for clarity.

FIG. 4 is a substantially diagrammatic sectional view of a portion of the apparatus of the present invention shown associated with structure of an automobile and shown in a position intermediate the first and second positions.

FIG. 5 is a sectional view similar to FIG. 4 but with the apparatus in the second position.

FIG. 6 is a top plan view of the substructure means of the apparatus of the present invention.

FIG. 7 is a sectional view as taken on line VII—VII of FIG. 6.

FIG. 8 is an enlarged sectional view as taken on line VIII—VIII of FIG. 6 with portions thereof broken away for clarity.

FIG. 9 is a top plan view of the superstructure means and the tongue means of the apparatus of the present invention.

FIG. 10 is a sectional view as taken on line X—X of FIG. 9.

FIG. 11 is a sectional view as taken on line XI—XI of FIG. 9.

DESCRIPTION OF THE PREFERRED EMBODIMENT

Figure 1:
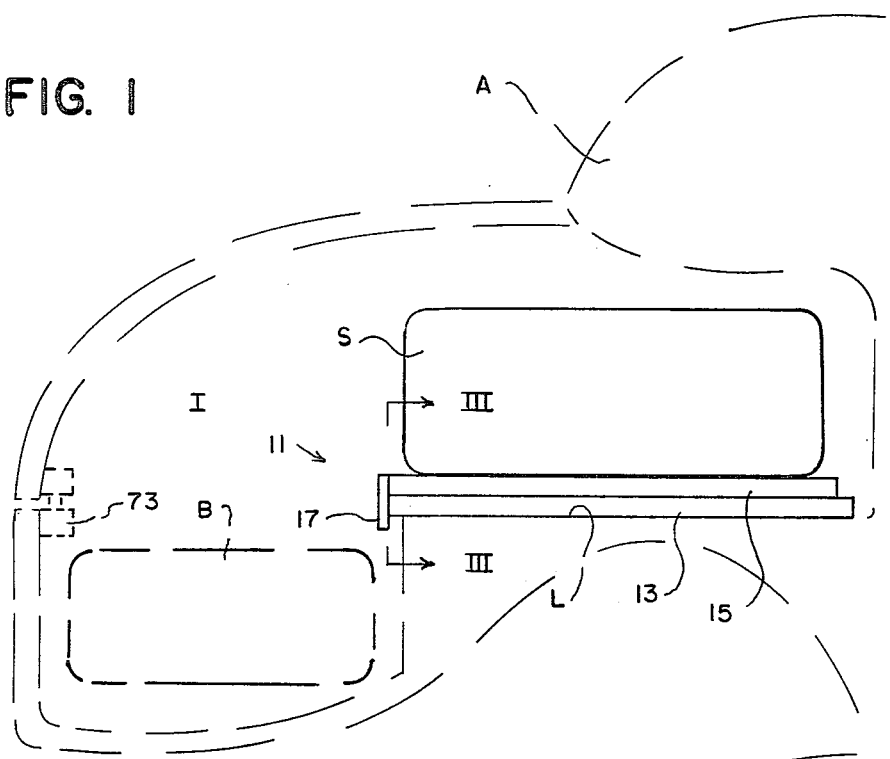
FIG. 1 is a side elevational view of the apparatus of the present invention shown in the first position with a spare tire attached thereto and mounted within the closed trunk of an automobile.
Figure 2:
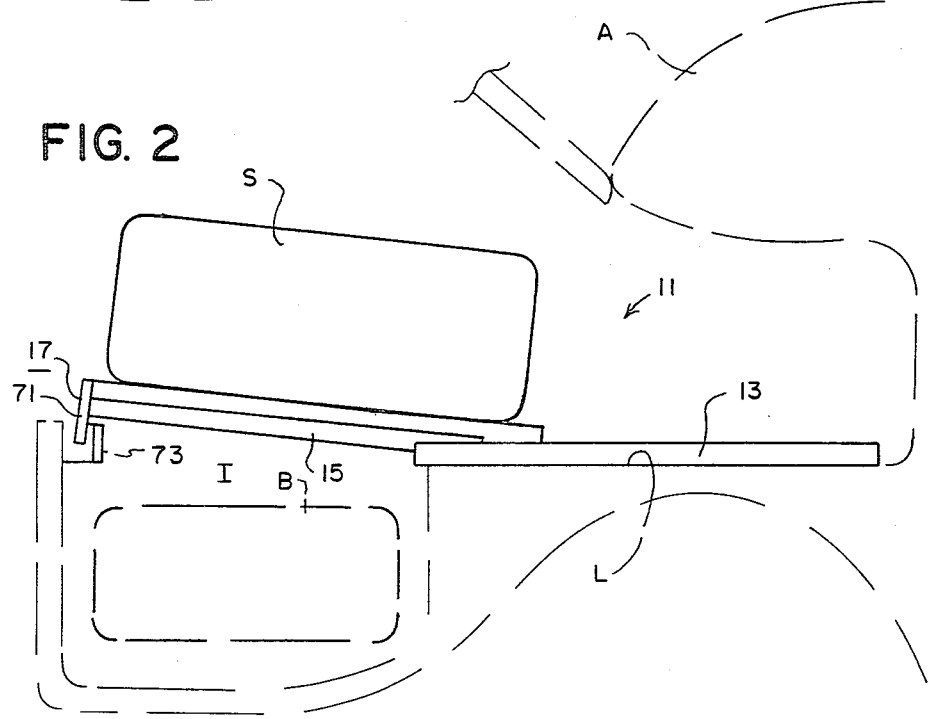
FIG. 2 is a side elevational view similar to FIG. 1 but with the trunk open and with the apparatus in the second position.

The apparatus 11 of the present invention is for being positioned within the trunk T of an automobile A (see, in general, FIGS. 1 and 2). The apparatus 11 is especially adapted to support the spare tire S of the automobile A and to allow the spare tire S to be removed from a first, stored, out-of-the-way location as shown in FIG. 1 to a second, easily accessible location as shown in FIG. 2 whereby the spare tire S may be easily removed from the trunk T without requiring the trunk T to be unloaded (i.e, baggage B and the like can remain in the trunk T when the spare tire is moved between the two locations). It will be understood that the apparatus 11 may be utilized in other manners such as, for example, supporting a tool box or the like within the trunk T for allowing the tool box or the like to be moved between a stored, out-of-the-way location and an easily accessible location. The apparatus 11 includes, in general, a substructure means 13, a superstructure means 15 and a tongue means 17.

The superstructure means 13 is for being attached to the structure of the automobile A within the trunk T thereof in a location which will not hinder the loading and unloading of the trunk T. Thus, for example, the substructure means 13 may be attached to the typical ledge L that is typically provided in a remote portion of the trunk T as clearly shown in FIGS. 1 and 2. The substructure means may be attached to this ledge L in any manner apparent to those skilled in the art such as by screws or the like. The substructure means includes a track means. The track means preferably includes a first track member 19 and a second track member 21. The substructure means 13 preferably includes a pan member 23 having an upper surface 24 and having opposing first and second upturned side edges 25, 27. The first track member 19 is defined in part by the first upturned side edge 25 of the pan member 23. The second track member 21 is defined in part by the second upturned side edge 27 of the pan member 23. The pan member 23 preferably includes an inwardly directed first downturned portion 29 on the upper end of the first upturned side edge 25 for further defining the first track member 19 (see, in general, FIG. 8). The pan member 23 preferably includes an inwardly directed second downturned portion 31 on the upper end of the second upturned side edge 27 for further defining the second track member 21 (see, in general, FIG. 8). The substructure means 12 preferably includes a plurality of roller means 33 for slidably supporting the superstructure means 15. The roller means 33 are preferably attached to the upper surface 24 of the pan member 23 between the first and second side edges 25, 27 thereof as clearly shown in FIG. 6. The roller means 33 may be constructed in any manner apparent to those skilled in the art. For example, each roller means 33 may include a roller member 35 supported by a pair of boss-like members 37 that are in turn fixedly attached to the upper surface 24 of the pan member 23 in any manner apparent to those skilled in the art such as by welding or the like (see, for example, FIG. 8). The pan member 23 of the substructure means 13 preferably includes an upturned back edge 39 for engaging a portion of the superstructure means 15 in a manner which will hereinafter become apparent to prevent rearward movement of the superstructure means 15 past the back edge 39 of the pan member 23 of the substructure 13. The pan member 23 has a front edge 41 which does not extend above the upper surface 24 thereof (see, for example, FIG. 7) for reasons which will hereinafter become apparent. The first and second downturn portions 29, 31 preferably extend from the back edge 39 towards the front edge 41 of the pan member but do not reach the front edge 41 as clearly shown in FIGS. 6 and 7 and for reasons which will hereinafter become apparent.

The superstructure means 15 includes race means for coacting with the tract means of the substructure means 13 to help guide the superstructure means 15 between a first position as shown in FIG. 1 in which the superstructure means is positioned substantially over the substructure means 13 and a second position as shown in FIG. 2 in which the superstructure means 15 extends outwardly from the substructure means 13 to position the spare tire S supported on the superstructure means 15 in a location where it can be easily removed from and returned to the trunk T. Preferably, the race means includes a first race member 43 for coacting with the first track member 19 of the substructure means 13 and preferably includes a second race member 45 for coacting with the second track means 21 of the substructure means 13. The superstructure means preferably includes a pan member 47 having an upper surface 49 and a bottom surface 50 and having opposing first and second upturned side edges 51, 53. The first race member 43 is defined by the first upturned side edge 51 of the pan member 47 and the second race member 45 is defined by the second upturned side edge 53 of the pan member 47. A portion of the first upturned side edge 51 of the pan member 47 of the superstructure means 15 slides between the first upturned side edge 25 and the first downturned portion 29 of the pan member 23 of the substructure means 13 (see, in general, FIG. 3). Likewise, a portion of the second upturned side edge 53 of the pan member 47 of the superstructure means 15 slides between the second upturned side edge 27 and the second downturned portion 31 of the pan member 23 of the substructure means 13. The roller means 35 of the substructure means 13 engages the bottom surface 50 the pan member 47 of the superstructure means 15 to slidably support the superstructure means 15. The superstructure means 15 preferably includes an attachment means 55 positioned on the upper surface 49 of the pan member 47 for allowing the spare tire S to be attached to the superstructure means 15. The attachment means 55 may be of various specific constructions. For example, the attachment means 55 may include a threaded stud member 57 fixedly attached to the upper surface 49 of the pan member 47 and extending upwardly therefrom for passing through a portion of the rim of the spare tire S in a manner which will be apparent to those skilled in the art and may include a coacting nut member 59 for being screwed on the stud member 57 with the spare tire S between the nut member 59 and the pan member 47 to thereby attach the spare tire S to the pan member 47. The superstructure means 15 preferably includes boss means positioned on the upper surface 47 of the pan member 47 for holding the spare tire S above the upstanding side edges 25, 27, 51, 53 of the substructure means 13 and superstructure means 15. The boss means may include a pair of spaced apart longitudinal members 63, 65 attached to the upper surface 49 of the pan member 47 extending along the length thereof and extending above the first and second side edges 51, 53 as clearly shown in FIGS. 9 and 11 and may include a cross member 65 extending between the longitudinal 61, 63 and extending above the first and second side edges 51, 53 as clearly shown in FIGS. 9 and 10. It should be noted that the stud member 57 may be fixedly attached to the cross member 65 substantially in the center of the pan member 47 as shown in FIGS. 9, 10, and 11 and in any manner apparent to those skilled in the art such as by welding or the like. The boss means acts to hold the tire above the upturned side edges 25, 27, 51, 53 whereby the superstructure means 15 can be easily moved to the second position and also acts to reinforce the pan member 47. The pan member 47 preferably has an upturned front edge 67 and an upturned rear edge 69. The upturned rear edge 69 of the pan member 47 does not extend upwardly as far as the upturned side edges 51, 53 thereof for allowing the downturned portions 29, 31 of the pan member 23 of the substructure means 13 to pass thereover when the superstructure means 15 is moved back and forth relative to the substructure means 13 as should now be apparent to those skilled in the art.

The tongue means 17 may be defined by a rigid, downwardly extending member 71 attached to substantially the midportion of the front edge 67 of the pan member 47 of the superstructure means 15 as clearly shown in FIGS. 9, 10 and 11. The downwardly extending member 71 may be attached to the pan member 47 in any manner apparent to those skilled in the art such as by welding or the like. The downwardly extending member 71 is adapted to engage structure of the automobile when the superstructure means 15 is in the second position to help support the superstructure means 15 and the spare tire S in the second position and to reduce any tendency of the superstructure means 15 to twist or turn when in the second position. The downwardly extending member 71 is preferably adapted to engage and extend into the typical trunk lock structure 73 of the automobile A when the superstructure means 15 is in the second position as should now be apparent to those skilled in the art (see FIGS. 2 and 5).

The apparatus 11 preferably includes lock means for locking the superstructure means 15 in the first position. The lock means may include a pin member 75 for extending through the aperture 77 in the first upturned side edge 25 of the pan member 23 of the substructure means 13 and an aperture 79 through the first upturned side edge 51 of the pan member 47 and an aperture 81 through at least a portion of the longitudinal member 61 of the superstructure means 15 when the superstructure means 15 is in the first position to thereby lock the superstructure means 15 in the first position (see, for example, FIG. 3). The pin member 75 may be coupled to the substructure means 13 by way of a flexible cable or the like (not shown).

The specific construction of the apparatus 11 may vary as will be apparent to those skilled in the art. The pan member 23, 47 may be constructed of sheet metal in any manner apparent to those skilled in the art.

The operation and use of the apparatus 11 of the present invention is as follows: With the spare tire S attached to the superstructure means 15 and in the stored position with the superstructure means 15 in the first position as shown in FIG. 1, access to the trunk T of the automobile A is substantially unhindered. To move the spare tire S to a position where it can be easily removed from and returned to the trunk T, the pin member 75 is removed from the apertures 77, 79, 81 and the superstructure means 15 is slid to the second position as shown in FIG. 2. After the superstructure means 15 has been moved towards the second position a sufficient amount, the downwardly extending member 71 of the tongue means 17 is inserted into the trunk lock structure 73 as clearly illustrated in FIGS. 4 and 5 whereby the spare tire S and the superstructure means 15 are firmly supported in the second position without excessive twisting or turning, etc.

Although the invention has been described and illustrated with respect to a preferred embodiment thereof, it is not to be so limited since changes and modifications may be made therein which are within the full intended scope of the invention.

I claim:

1. An apparatus for being positioned within the trunk of an automobile and for supporting a spare tire for the automobile, said apparatus comprising:
   (a) substructure means for attachment to structure of the automobile within the trunk thereof in a location which will not hinder the loading and unloading of the trunk, said substructure means including track means;
   (b) superstructure means for selectively supporting the spare tire, said superstructure means including race means for coacting with said track means to guide said superstructure means between a first position in which said superstructure means is positioned substantially over said substructure means to position the spare tire in a location where it can be easily removed from the trunk; and
   (c) tongue means attached to said superstructure means for engaging structure of the automobile when said superstructure means is in said second position; said substructure means including a plurality of roller means for slidably supporting said superstructure means; said track means including first and second track members; said race means including first and second race members for coacting with said first and second track members respectively; said substructure means including a pan member having an upper surface and having opposing first and second upturned side edges; said first track member being defined in part by said first upturned side edge of said pan member; said second track member being defined in part by said second upturned side edge of said pan member; said roller means being attached to said upper surface of said pan member between said first and second side edges thereof.

2. The apparatus of claim 1 in which said superstructure means includes a pan member having an upper surface and having opposing first and second upturned side edges; in which said first race member is defined by said first upturned side edge of said pan member; in which said second race means is defined by said second upturned side edge of said pan member; and in which said superstructure means includes attachment means for allowing the spare tire to be attached to said superstructure means.

3. The apparatus of claim 2 in which said pan member of said substructure means includes an inwardly directed first downturned portion on the upper end of said first upturned side edge for further defining said first track member and includes an inwardly directed second downturned portion on the upper end of said second upturned side edge for further defining said second track member; in which a portion of said first upturned side edge of said pan member of said superstructure means slides between said first upturned side edge and said first downturned portion of said pan member of said substructure means; and in which a portion of said second upturned side edge of said pan member of said superstructure means slides between said second upturned side edge and said second downturned portion of said pan member of said substructure means.

4. The apparatus of claim 3 in which said pan member of said substructure means includes an upturned back edge for engaging said pan member of said superstructure means to prevent rearward movement of said superstructure means past said back edge of said pan member of said substructure means.

5. The apparatus of claim 4 in which said first upturned side edge of said pan member of said substructure means has an aperture therethrough; in which said first upturned side edge of said pan member of said superstructure means has an aperture therethrough; in which said apertures through said first upturned side edge of said pan members of said substructure means and said superstructure means are aligned with one another when said superstructure means is in said first position; and in which is included a pin member for side edges of said pan members of said substructure means to lock said superstructure means in said first position.

6. The apparatus of claim 5 in which said superstructure means includes boss means positioned on said upper surface of said pan member of said superstructure means for holding the spare tire above said upstanding side edges of said pan members of said substructure means and said superstructure means.

* * * * *